United States Patent
Chou et al.

(10) Patent No.: US 9,268,680 B2
(45) Date of Patent: Feb. 23, 2016

(54) ELECTRONIC APPARATUS WITH COMPRESSED DATA STORAGE AND CONTROL METHOD THEREOF

(71) Applicant: MStar Semiconductor, Inc., Hsinchu Hsien (TW)

(72) Inventors: Shu-Cheng Chou, Hsinchu Hsien (TW); Yu-Kuey Wu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 200 days.

(21) Appl. No.: 13/964,183

(22) Filed: Aug. 12, 2013

(65) Prior Publication Data

US 2014/0068141 A1    Mar. 6, 2014

(30) Foreign Application Priority Data

Aug. 28, 2012  (TW) .............................. 101131208 A

(51) Int. Cl.
*G06F 12/02* (2006.01)
*G06F 15/82* (2006.01)
*G06F 9/455* (2006.01)
*G06F 12/08* (2006.01)

(52) U.S. Cl.
CPC ............ *G06F 12/0238* (2013.01); *G06F 12/08* (2013.01); *G06F 2212/401* (2013.01)

(58) Field of Classification Search
None
See application file for complete search history.

(56) References Cited

U.S. PATENT DOCUMENTS

| 5,617,552 | A * | 4/1997 | Garber et al. ....................... 711/1 |
| 6,349,375 | B1 * | 2/2002 | Faulkner et al. ............... 711/173 |
| 2009/0254705 | A1 * | 10/2009 | Abali et al. .................... 711/117 |

FOREIGN PATENT DOCUMENTS

| CN | 1188784 C | 12/2001 |
| CN | 101188833 B | 5/2008 |

OTHER PUBLICATIONS

Taiwan Office Action, Sep. 23, 2014, 7 pages.

* cited by examiner

*Primary Examiner* — Kevin Verbrugge
(74) *Attorney, Agent, or Firm* — Edell, Shapiro & Finnan, LLC

(57) ABSTRACT

An electronic apparatus includes a read-only memory (ROM), a random access memory (RAM), a processing module, a demand paging module and a decompression module. The ROM stores multiple sets of compressed data corresponding to a plurality of sets of uncompressed data. The plurality of sets of uncompressed data are divided from one same set of original data. According to a request associated with the set of original data and from the processing module, the demand paging module selects one or more sets from the multiple sets of compressed data. The decompression module decompresses and stores the selected one or more sets of compressed data to the RAM for use of the processing module.

9 Claims, 2 Drawing Sheets

ELECTRONIC APPARATUS WITH COMPRESSED DATA STORAGE AND CONTROL METHOD THEREOF

This application claims the benefit of Taiwan application Serial No. 101131208, filed Aug. 28, 2012, the subject matter of which is incorporated herein by reference.

BACKGROUND OF THE INVENTION

1. Field of the Invention

The invention relates in general to a memory technique, and more particularly to a technique for saving memory space.

2. Description of the Related Art

Code and data that are no longer to be modified after electronic products are shipped out of the factory are generally recorded in a read-only memory (ROM). In the recently years, one development trend for consumer electronic products has been to integrate various functions into a single product. For example, portable handsets are designed to support extra functions such as a camera and Internet browsing in addition to basic telephone functions. Diversified functions lead to large and complex coding. To store a greater amount of code and data, the capacity of a ROM built into an electronic product is inevitably and correspondingly enlarged, leading to increased hardware costs.

In response to the above issue, a current solution is to burn compressed code and data into a ROM. Taking an example of compressing a code of an application and burning the compressed code into a ROM, an electronic device first fetches the compressed code from the ROM, and then decompresses the code through a decompressor to a random access memory (RAM) for the use of a corresponding processor.

In the prior art, an application is utilized as a unit of compression/decompression. In other words, when a certain application is needed, an electronic device is required to decompress all code of the desired application to a RAM in order to utilize the application. However, the above approach suffers from a drawback that the RAM must have a large capacity for accommodating all kinds of decompressed code. Thus, hardware costs of an electronic product are again increased due to a costly RAM.

SUMMARY OF THE INVENTION

The invention is directed to an electronic device and control method thereof. By utilizing appropriately divided program code or data as a unit of compression/decompression and incorporating a demand paging technique, the electronic device and control method thereof disclosed by the present invention effectively reduce a required memory space of a random access memory (RAM) to lower hardware costs of the electronic device.

According to an aspect of the present invention, an electronic device is provided. The electronic device includes a read-only memory (ROM), a RAM, a processing module, and a demand paging module and a decompression module. The ROM stores a plurality of sets of compressed data corresponding to a plurality of sets of uncompressed data. The plurality of sets of uncompressed data are divided from a same set of original data. In response to a request associated with the set of original data and from the processing module, the demand paging module selects one or more sets from the multiple sets of compressed data. The decompression module decompresses and stores the selected compressed data to the RAM for the use of the processing module.

According to another aspect of the present invention, a control method for an electronic device is provided. The electronic device includes a ROM and a RAM. The ROM stores a plurality of sets of compressed data corresponding to a plurality of sets of uncompressed data. The plurality of sets of uncompressed data are divided from a same set of original data. In response to a request associated with the original data, one or more sets of compressed data are selected from the plurality of sets of compressed data. The selected one or more sets of compressed data are decompressed and stored to the RAM. An operation associated with the set of original data is performed according to a set of decompressed data generated from decompressing the one or more sets of compressed data.

According to yet another aspect of the present invention, a computer-readable storage medium is provided. The computer-readable storage medium stores program code that is readable and executable by a controller. The program code is for controlling an electronic device. The electronic device includes a ROM and a RAM. The ROM stores a plurality of sets of compressed data corresponding to a plurality of sets of uncompressed data. The plurality of sets of uncompressed data are divided from a same set of original data. In response to a request associated with the set of original data, a first set of program code of the program code selects one or more sets of compressed data from the plurality of sets of compressed data. A second set of program code of the program code decompresses and stores the selected one or more sets of compressed data to the RAM. A third set of program code of the program code executes an operation associated with the set of original data according to decompressed data generated from decompressing the selected one or more sets of compressed data.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
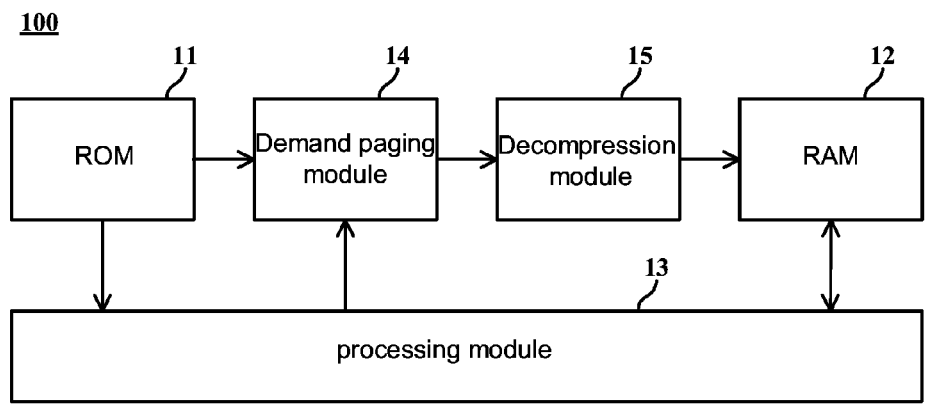
FIG. 1 is a block diagram of an electronic device according to an embodiment of the present invention.

Referring to FIG. 1, an electronic device 100 according to an embodiment of the present invention includes a read-only memory (ROM) 11, a random-access memory (RAM) 12, a processing module 13, a demand paging module 14 and a decompression module 15. In practice, the electronic device 100 may be a device that stores data and program code in a ROM, e.g., a smart handset, a personal digital assistant (PDA), a laptop computer, a game console or a portable pad.

Figure 2A:
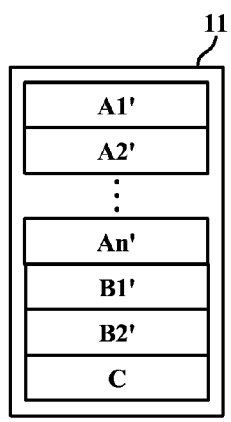
FIG. 2A is an example of stored contents in the ROM according to the present invention.

The ROM 11 stores a plurality of sets of compressed data. In practice, the plurality of sets of compressed data may respectively correspond to various kinds of program code, software data or user data. FIG. 2A shows an example of stored contents in the ROM 11. Compressed data A1' to An' correspond to an application A, and respectively include a part of a compressed program code of the application A. Compressed data B1' and B2' correspond to software data B, and respectively include a part of the compressed software data B. In addition, the ROM 11 in the embodiment further stores a set of uncompressed user data C.

Figure 2B:
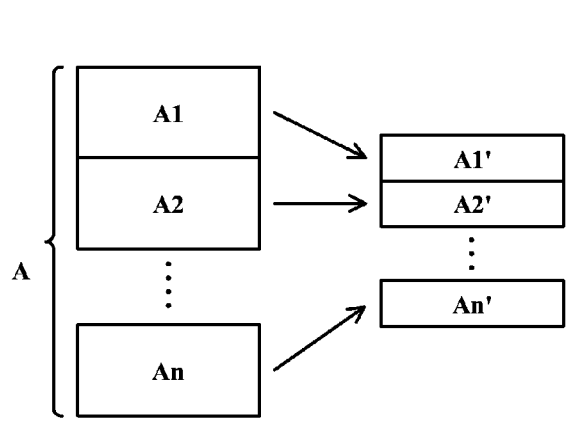
FIG. 2B is a corresponding relationship between compressed data and original data.

FIG. 2B shows a corresponding relationship between the compressed data A1' to An' and the application A. The application A is divided into an n number of parts A1 to An before being compressed. The n number of parts are later respectively compressed into the plurality of sets of compressed data A1' to An'. In other words, the compressed data A1' to An' respectively correspond to uncompressed data A1 to An divided from a same set of original data (i.e., the program code of the application A). In practice, a basis for dividing the application A may be a data size. For example, the program code corresponding to the application A is divided into an n number of same-sized parts. Alternatively, a basis for dividing the program code of the application A may be according to module type. For example, the data A1 to An may be respectively associated with different function modules of the application A. It should be noted that, the number of data generated after dividing one set of the original data is not limited to a particular number.

When the processing module 13 initiates a utilization request for the application A, the demand paging module 14 determines in which page(s) the program code needed by the processing module 13 is included (e.g., according to a mapping table). Assume that the program code needed by the processing module 13 is included in the compressed data A1' to A3'. In an embodiment, the processing module 13 prompts the demand paging module 14 to fetch the compressed data A1' to A3' from the ROM 11, and provides the compressed data A1' to A3' to the decompression module 15. The decompression module 15 then stores the decompressed data (the uncompressed data A1 restored) to the RAM 12 for the use of the processing module 15. In an alternative embodiment, the processing module 13 prompts the demand paging module 14 to process one set of compressed data at a time, e.g., the compressed A1' is first processed. The compressed data A1' is decompressed, and the data (e.g., the uncompressed data A1 restored) generated from decompression is first stored to a block 12*a* in the RAM 12 and then executed. The demand paging module 14 performs the same process on the compressed data A2', and stores the data A2 generated from decompression to another block 12*b* of the RAM 12 and executes the data A2. Assuming that the decompressed data corresponding to the data A1' is fully executed, the decompressed data A3 corresponding to the third set of compressed data A3' may be stored to the same block of the RAM 12 as the decompressed data corresponding to the data A'. That is, the fully executed data A1 stored in the block 12*a* can be overwritten.

In the above example, the RAM 12 is required to have a capacity sufficient for storing only the uncompressed data A1 to A3 or A1 to A2. That is to say, the capacity of the RAM 12 is not necessarily designed to be sufficient for accommodating all program code (including the uncompressed data A1 to An) of the application A. Similarly, if the utilization request initiated by the processing module 13 for software data B is included in the compressed data B2', instead of simultaneously selecting the compressed data B1' and B2', the demand paging module 14 may select only the compressed data B2' from the ROM 11. In addition to the advantage of saving space of the ROM through the compression technique, such an approach evidently reduces a capacity requirement on the RAM 12.

Further, if the processing module 13 initiates a utilization request for the user data C, the processing module 13 may directly fetch the user data C from the ROM 11. It should be noted that, when insufficient space is left in the RAM 12, the processing module 13 may command to delete or overwrite data in the RAM 12 currently not needed to release a space for accommodating a latest output of the decompression module 15.

In an embodiment, the RAM 12 is divided into two sections—a first section for storing decompressed data generated by the decompression module 15, and a second section for storing other data outputted by the decompression module 15. The size of the first section may be fixed, or may be dynamically adjusted according to controls of the processing module 13. For example, to enhance performance of the processing module 13 when executing the application A, the processing module 13 may expand the first section while reducing the second section, and prompt the demand paging module 14 and the decompression module 15 to decompress all of the compressed data A1' to A3' to the RAM 12, so as to allow the processing module 13 to immediately utilize all of the program code of the application A. In contrast, if the application A is determined to be an application of a lesser priority, the processing module 13 may restrict the size of the first section to accommodate only one set of decompressed data.

Figure 3:
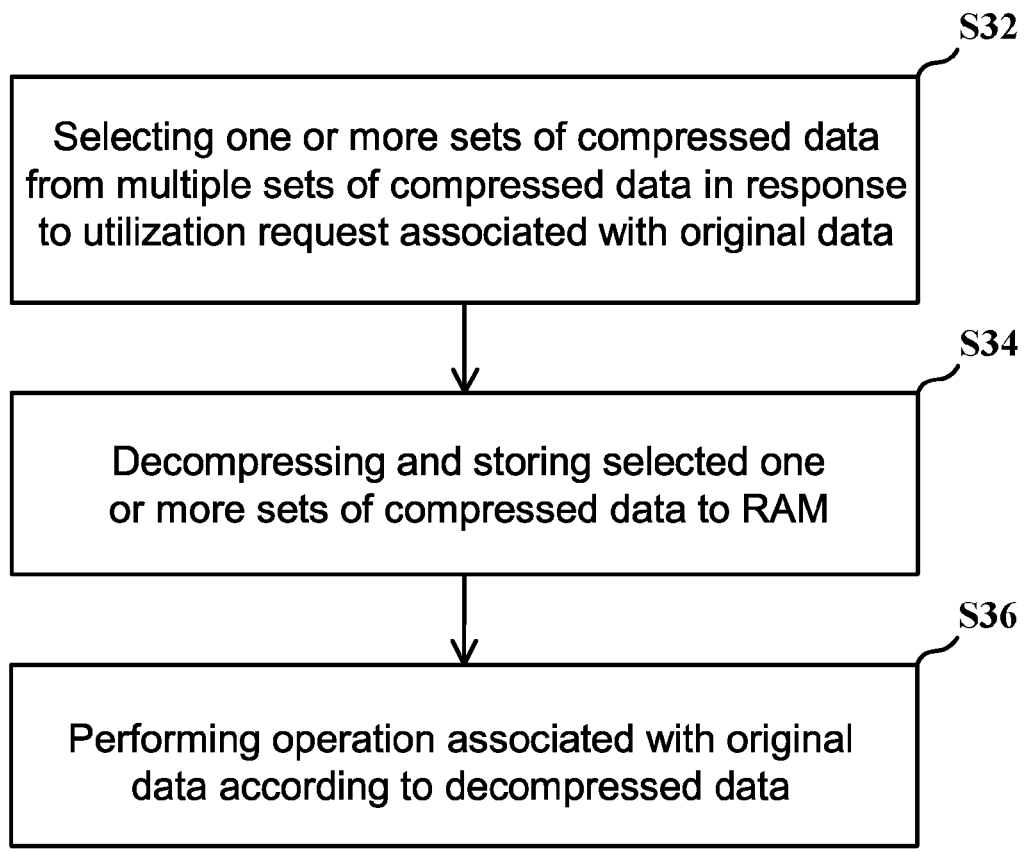
FIG. 3 is a control method according to an embodiment of the present invention.

FIG. 3 shows a flowchart of a control method for an electronic device according to another embodiment of the present invention. The electronic device includes a ROM and a RAM. The ROM stores a plurality of sets of compressed data corresponding to a plurality of sets of uncompressed data. The uncompressed plurality of sets data are divided from a same set of original data. In step S32, in response to a request associated with the set of original data, one or more sets of compressed data are selected from the plurality of sets of compressed data. In step S34, the selected one or more sets of compressed data are decompressed and stored to the RAM. In step S36, an operation associated with the set of original data is performed according to a set of decompressed data generated from decompressing the selected one or more sets of compressed data.

Various modifications (e.g., details for dividing the uncompressed data) in the foregoing description associated with the electronic device 100 may be applied to the control method in FIG. 3, and shall be omitted herein.

A computer-readable storage medium is further provided according to yet another embodiment of the present invention. The computer-readable storage medium stores program code that is readable and executable by a controller. The program code is for controlling an electronic device. The electronic device includes a ROM and a RAM. The ROM stores a plurality of sets of compressed data corresponding to a plurality of sets of uncompressed data. The plurality of sets of uncompressed data are divided from a same set of original data. In response to a request associated with the set of original data, a first set of program code of the program code selects one or more sets of compressed data from the plurality of sets of compressed data. A second set of program code of the program code decompresses and stores the selected one or more sets of compressed data to the RAM. A third set of program code of the program code executes an operation associated with the set of original data according to a set of decompressed data generated from decompressing the selected one or more sets of compressed data.

As described in the foregoing embodiments, an electronic device and control method thereof is disclosed by the present invention. By utilizing appropriately divided program code or data as a unit of compression/decompression and incorporating a demand paging technique, the electronic device and control method thereof disclosed by the present invention effectively reduces a required memory space of ROM to further lower hardware costs of the electronic device.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
a read-only memory (ROM) that stores a plurality of sets of compressed data corresponding to a plurality sets of uncompressed data, wherein the plurality sets of uncompressed data are divided from one same set of original data;
a random access memory (RAM);
a processing module, coupled to the ROM and the RAM;
a demand paging module that receives a request from the processing module and upon determining that the request is aiming at one set of the compressed data that only corresponds to one set of the uncompressed data of the original data, selects only the one set of the compressed data; and
a decompression module, coupled to the demand paging module, that decompresses and stores the one set of compressed data selected by the demand paging module to the RAM for use by the processing module,
wherein the RAM comprises a memory section for storing a set of decompressed data generated from decompressing the selected one set of compressed data by the decompression module;
the processing module dynamically adjusts a size of the memory section, and
wherein the processing module dynamically adjusts a size of the memory section based on priority of an application associated with the set of compressed data.

2. The electronic device according to claim 1, wherein the set of original data is a set of program code, a set of software data or a set of user data.

3. The electronic device according to claim 1, wherein the plurality of sets of uncompressed data are divided from the set of original data according to a data size or a module type.

4. A control method for an electronic device, the electronic device comprising a ROM and a RAM, the ROM storing a plurality of sets of compressed data corresponding to a plurality of sets of uncompressed data, the uncompressed data being divided from a same set of original data, the control method comprising:
in response to a request associated with the set of original data, selecting only one set of compressed data from the plurality of sets of compressed data that only corresponds to one set of the uncompressed data of the original data;
decompressing and storing the selected one set of compressed data to the RAM; and
performing an operation associated with the set of original data according to a set of decompressed data generated from decompressing the selected one set of compressed data,
the RAM comprising a memory section for storing a set of decompressed data generated from decompressing the selected one set of compressed data by the decompression module, the method further comprising:
dynamically adjusting a size of the memory section,
wherein dynamically adjusting a size of the memory section comprises dynamically adjusting a size of the memory section based on a priority of an application associated with the set of compressed data.

5. The control method according to claim 4, wherein the set of original data is a set of program code, a set of software data or a set of user data.

6. The control method according to claim 4, wherein the plurality of sets of uncompressed data are divided from the set of original data according to a data size or a module type.

7. A computer-readable storage medium that stores program code readable and executable by a controller, the program code configure to control an electronic device, the electronic device comprising a ROM and a RAM, the ROM storing a plurality of sets of compressed data corresponding to a plurality of sets of uncompressed data, the uncompressed data being divided from a same set of original data; wherein, the program code comprises:
a first set of program code that receives a request from a processing module and upon determining that the request is aiming at one set of the compressed data that only corresponds to one set of the uncompressed data of the original data, selects only the one set of the compressed data;
a second set of program code, for decompressing and storing the selected one or more sets of compressed data to the RAM; and
a third set of program code, for executing an operation associated with the set of original data according to a set of decompressed data generated from decompressing the selected set of compressed data,
wherein the RAM comprises a memory section for storing a set of decompressed data generated from decompressing the selected one set of compressed data by the decompression module, and the program code further comprises:
a fourth set of program code, for dynamically adjusting a size of the memory section, and
wherein the fourth set of program code dynamically adjusts a size of the memory section based on a priority of an application associated with the set of compressed data.

8. The computer-readable storage medium according to claim 7, wherein the set of original data is a set of program code, a set of software data or a set of user data.

9. The computer-readable storage medium according to claim 7, wherein the plurality of sets of uncompressed data are divided from the set of original data according to a data size or a module type.

* * * * *